United States Patent [19]
Berglund et al.

[11] Patent Number: 5,839,155
[45] Date of Patent: Nov. 24, 1998

[54] CONTINUOUS FLOW CLEANING SYSTEM WITH OZONE INJECTION

[75] Inventors: Edward D. Berglund, Maplewood; Sung K. Cho, Roseville; Lowell H. Schiebe, Corcoran, all of Minn.

[73] Assignee: CFR Corporation, New Brighton, Minn.

[21] Appl. No.: 659,393

[22] Filed: Jun. 6, 1996

[51] Int. Cl.⁶ .................................................. A47L 11/34
[52] U.S. Cl. .............................................. 15/321; 15/339
[58] Field of Search ...................................... 15/320, 321

[56] References Cited

U.S. PATENT DOCUMENTS

| | | |
|---|---|---|
| 2,242,163 | 5/1941 | Bargeboer . |
| 2,297,923 | 10/1942 | Yonkers . |
| 3,262,146 | 7/1966 | Hays . |
| 3,402,420 | 9/1968 | Schaeffer . |
| 3,431,582 | 3/1969 | Grave . |
| 3,607,760 | 9/1971 | McIntyre . |
| 3,731,814 | 5/1973 | Walters . |
| 3,739,417 | 6/1973 | Sawyer . |
| 3,840,935 | 10/1974 | Fitzgerald, Jr. et al. . |
| 3,879,789 | 4/1975 | Kasper . |
| 4,069,540 | 1/1978 | Zamboni . |
| 4,153,968 | 5/1979 | Perkins . |
| 4,168,562 | 9/1979 | Maasberg . |
| 4,297,209 | 10/1981 | DeVisser et al. . |
| 4,392,270 | 7/1983 | Magee . |
| 4,458,377 | 7/1984 | Frohbieter . |
| 4,483,041 | 11/1984 | Waldhauser et al. . |
| 4,485,519 | 12/1984 | Collier . |
| 4,488,330 | 12/1984 | Grave . |
| 4,490,270 | 12/1984 | Hackett et al. . |
| 4,596,061 | 6/1986 | Henning . |
| 4,649,594 | 3/1987 | Grave . |
| 4,654,925 | 4/1987 | Grave . |
| 4,696,075 | 9/1987 | Grave . |
| 4,709,442 | 12/1987 | Sletten, II . |
| 4,720,889 | 1/1988 | Grave . |
| 4,809,397 | 3/1989 | Jacobs et al. . |
| 4,833,752 | 5/1989 | Merrick . |
| 4,834,948 | 5/1989 | Schmiga et al. . |
| 4,879,784 | 11/1989 | Shero . |
| 4,953,254 | 9/1990 | Kohl et al. . |
| 4,978,284 | 12/1990 | Cook et al. . |
| 5,114,574 | 5/1992 | Barry . |
| 5,185,903 | 2/1993 | Choi . |
| 5,252,243 | 10/1993 | Minns . |
| 5,259,955 | 11/1993 | Bolton . |
| 5,284,597 | 2/1994 | Rees . |
| 5,287,590 | 2/1994 | Yonkers et al. . |
| 5,338,475 | 8/1994 | Corey et al. . |
| 5,348,556 | 9/1994 | Minns et al. . |
| 5,389,278 | 2/1995 | Minns et al. . |
| 5,432,975 | 7/1995 | Hilmanowski . |
| 5,453,193 | 9/1995 | Maher et al. . |
| 5,472,604 | 12/1995 | Yang . |
| 5,492,540 | 2/1996 | Leifheit et al. . |
| 5,493,754 | 2/1996 | Gurstein et al. . |
| 5,522,580 | 6/1996 | Varner, Jr. et al. . |
| 5,611,868 | 3/1997 | Gurstein et al. . |

*Primary Examiner*—Chris K. Moore
*Attorney, Agent, or Firm*—Frederick W. Niebuhr

[57] ABSTRACT

A continuous flow recycling cleaning system includes a canister containing a liquid cleaning solution, and a dispensing conduit for conveying the cleaning solution from the canister to a cleaning tool head for direct application to a carpet, upholstery fabric or other material at an application area. A recovery conduit is connected to the cleaning tool head for returning recovered cleaning solution, along with air and extracted soil, to the canister. The system includes at least one ozone injector selectively positioned along a fluid flow pathway that includes the canister, the dispensing and recovery conduits, and the cleaning tool head. The fluid flow pathway further can include a counterflow conduit and an ozone-introduction conduit provided solely for the injection of ozone. Each injector is coupled to an ozone generator, to combine the ozone with the cleaning solution flowing through the injector. A portion of the ozone is dissolved in the liquid cleaning solution for cleaning, sanitizing and deodorizing the application area and interior surfaces along the fluid flow pathway. A surfactant is incorporated into the cleaning solution to improve the retention of dissolved ozone. A portion of the ozone remaining in the gaseous state sanitizes and deodorizes air within the system. The system includes an air exhaust, which can incorporate a filter for reducing ozone concentrations in the expelled air.

33 Claims, 4 Drawing Sheets

CONTINUOUS FLOW CLEANING SYSTEM WITH OZONE INJECTION

BACKGROUND OF THE INVENTION

The present invention relates to cleaning systems that cycle liquid cleaning solutions, and more particularly to apparatus for providing antimicrobial, disinfectant or sanitizing agents to the liquids cycled in such systems.

Continuous flow recycling has gained widespread acceptance as an effective technique for cleaning carpets, upholstery, fabric, wall coverings and hard surfaces. According to this technique, a liquid cleaning solution is sprayed toward a surface being cleaned. Simultaneously, a vacuum source creates a high velocity airstream that draws the atomized liquid toward the surface and into the material beneath the surface in the case of porous material. Almost immediately the airstream is diverted to draw the liquid upwardly away from the surface, along with air, and soil and other contaminants extracted from the surface and porous material beneath the surface. The result is an efficient recovery of most of the cleaning solution, so that recovered solution may be filtered and recycled to extract further foreign matter from surfaces being cleaned.

Continuous flow recycling systems often include a tank of liquid cleaning solution supported on a wheel-mounted base. The base also supports a motor and a pump for circulating the cleaning solution, and a vacuum motor and a blower for recovering the solution and returning it to the tank. A cleaning head is coupled to the tank through tubing to transport solution from the tank to the cleaning head. The cleaning head further is coupled to the tank or canister through vacuum hosing to transfer recovered cleaning solution and air from the cleaning head back to the tank, where the recovered cleaning solution is filtered and recycled.

Alternatively, the surface cleaning apparatus can be self-contained, with a housing that incorporates the necessary motors and contains the cleaning fluid. Then, the cleaning tool head is mounted directly to the housing, such as through a pair of pivot arms. This approach is described in U.S. Pat. No. 5,432,975 (Hilmanowski), assigned to the assignee of this application.

These systems have been found to be effective in removing and suspending soil. Other contaminants, however, can be difficult to control with ordinary cleaning solutions. Carpets and upholstery fabric, particularly in warm and humid environments, can be excellent breeding grounds for micro-organisms. This is a widespread problem, that can be of particular concern in hospitals, clinics, and other treatment and diagnostic facilities. In these cases, the conventional cleaning solutions can be combined with additives such as quaternary ammonium compounds, chlorine, or acidic sanitizers. Each of these has its undesirable qualities. The quaternary compounds have only a limited effect on gram-positive bacteria and tend to leave a residue that attracts soil to the surface just cleaned. Chlorine compounds are not effective in high soil load conditions, are corrosive to metals and certain other materials, can bleach dyes and can degrade natural fibers such as wool and cotton. Finally, acidic sanitizers are not particularly effective against yeasts and molds and have a residual acidity that may even promote the growth of certain yeasts and molds. All of these additives are potential pollutants that raise problems of waste disposal.

Continuous flow recycling systems further involve the accumulation of the microbiological organisms and other contaminants that are not effectively reduced in concentration or eliminated by the particular additive being employed. This specific problem is avoided in alternative systems that do not recycle the liquid cleaning solution. Such alternative systems, however, are subject to all of the other difficulties just discussed. Further, they require frequent replenishment of the cleaning solution and waste disposal of the recovered solution.

Therefore, it is an object of the present invention to provide a cleaning system in which a liquid cleaning solution can be effectively utilized against contaminants resistant to ordinary cleaning solutions, while avoiding unwanted residues, waste disposal problems and corrosion or other damage to materials.

Another object is to provide a means for introducing an additive into a liquid cleaning solution being cycled, that enhances sanitizing effectiveness of the solution and tends to sanitize and deodorize the air near where the cleaning solution is contained and applied.

It is a further object to provide a liquid cycling cleaning system in which a fluid pathway traversed by the cleaning solution enables the selection of different locations for introducing a sanitizing additive, to suit different purposes.

Yet another object is to provide, in a fluid cycling cleaning system, a fluid flow pathway and a sanitizing additive introduced along the pathway, to more effectively degrade organic soils and sanitize treated surfaces, and to more effectively maintain the fluid cycling equipment in a cleaner, more sanitized condition.

SUMMARY OF THE INVENTION

To achieve these and other objects, there is provided a fluid cycling cleaning system. The system includes a reservoir containing a liquid cleaning solution. A conveying means is provided for moving the liquid cleaning solution into and out of the reservoir. The conveying means includes at least a dispensing conduit in fluid communication with a reservoir for conveying the cleaning solution from within the reservoir to an application area outside of the reservoir, and a supply conduit in fluid communication with the reservoir for providing the liquid cleaning solution to the reservoir.

The reservoir and conveying means cooperate to provide a fluid pathway for the liquid cleaning solution. The system further includes an ozone source. A coupling means fluid couples the ozone source and the fluid pathway, for introducing ozone from the ozone source into the fluid pathway at a selected location along the fluid pathway.

The preferred ozone source includes an ozone generator that introduces ozone in the gaseous state. Some of the ozone is dissolved into the liquid cleaning solution, while some of the ozone remains in the gaseous state.

In either case the ozone is a powerful oxidizing agent and an effective biocide at low concentrations, e.g. in the range of 0.01–4 ppm (parts per million). Ozone also tends to degrade organic soils and has from 2 to 50 times the effectiveness of chlorine with regard to microorganisms.

Ozone is highly water soluble, more so than oxygen, so that it readily combines with any water-based cleaning solution. Concentrations in air or water readily diminish due to the transient nature of ozone (approximately 20 minute half-life). Consequently ozone leaves no residue to attract contaminants to surfaces just cleaned. Decomposition of ozone produces oxygen, avoiding any concerns of toxicity, pollution or waste disposal. At low concentration levels, ozone is non-corrosive and does not discolor or otherwise degrade carpeting or fabric.

The use of ozone in a continuous flow recycling system is especially advantageous. In such systems, the fluid supply conduit includes a recovery segment in fluid communication with the application area and an air cavity in the reservoir above the cleaning solution. An exhaust system creates a partial vacuum in the cavity, thus to draw air, cleaning solution and soil into the reservoir.

The presence of ozone is beneficial throughout the system. At the cleaning tool head, cleaning solution treated with ozone works directly upon the carpeting or other surface. In the recovery segment, ozone continues to work on the soils which have been extracted from the surface and further tends to sanitize and maintain the cleanliness of the hosing forming the recovery segment.

Ozone dissolved in the cleaning solution within the reservoir or tank continues to work on soils returned to the tank from the application area. Some of the ozone escapes from cleaning solution in the tank and interacts with air in the cavity above the cleaning solution. This combines with undissolved gaseous ozone returned to the cavity via the recovery segment, for a "cleansing" effect, to provide cleaner and more sanitized exhaust air.

To ensure that the exhaust system expels air with sufficiently safe (low) concentrations of ozone, an activated carbon filter or ultraviolet energy source can be provided in the exhaust system.

Ozone can be provided selectively along the fluid flow pathway, to particularly emphasize one or more of the advantages just mentioned. For example, ozone can be introduced in the dispensing conduit, or directly at the cleaning tool head, for maximum impact on the carpeting or fabric. As an alternative, the ozone can be introduced along the recovery segment, or along a conduit provided solely for the introduction of ozone, having an inlet and an outlet both fluid coupled to the reservoir. In systems featuring a counterflow conduit for filter clearance, ozone can be introduced along the counterflow path.

A preferred coupling means for introducing ozone includes an injector along one of the conduits, with an inlet receiving the cleaning solution and another inlet comprising a suction port receiving ozone from the ozone source. The injector has a single outlet which provides the cleaning solution and ozone, mingled, to the conduit just downstream of the injector. Frequently, the flow of liquid cleaning solution through the injector is sufficient for drawing ozone from the ozone source. Otherwise a gas pump can be inserted between the ozone source and the injector. A liquid pump, preferably disposed upstream of the injector in the associated conduit, is provided if desired to ensure adequate liquid flow.

Another aspect of the invention is a process, practiced in a fluid cycling cleaning system that includes a reservoir containing a liquid cleaning solution, a dispensing conduit and a return conduit. The process includes the following steps:

a. using the dispensing conduit to convey the cleaning solution from the reservoir to an application area;
b. using the return conduit to convey the cleaning solution from the application area back to the reservoir after its application;
c. fluid coupling an ozone source to a selected location along a fluid flow pathway that includes at least the reservoir, the dispensing conduit and the return conduit; and
d. conveying ozone from the ozone source to the selected location and intermingling the ozone and the cleaning solution at the selected location, whereby the cleaning solution downstream of the selected location incorporates the ozone.

Thus in accordance with the present invention, a highly effective sanitizing and antibacterial additive is combined with a liquid cleaning solution, not only to enhance cleaning and sanitizing but to avoid corrosion, damage to fabric and waste disposal problems. Ozone, as it circulates with the cleaning solution, readily dissolves in the solution for effective application to surfaces under treatment, tends to sanitize and maintain cleanliness of all system components, and further tends to deodorize and sanitize air within the reservoir of the cleaning system. Decomposition of the ozone into oxygen avoids the problems of unwanted residue, pollution and waste disposal present with conventional sanitizing agents such as quaternary ammonium compounds, chlorine and acids. Thus, along with more effective cleaning, sanitizing and deodorizing of treated surfaces, the components of the cleaning system are better maintained for longer life and more efficient operation.

IN THE DRAWINGS

For a further understanding of the above and other features and advantages, reference is made to the following detailed description and to the drawings, in which.

DETAILED DESCRIPTION OF THE PREFERRED EMBODIMENTS

Figure 1:
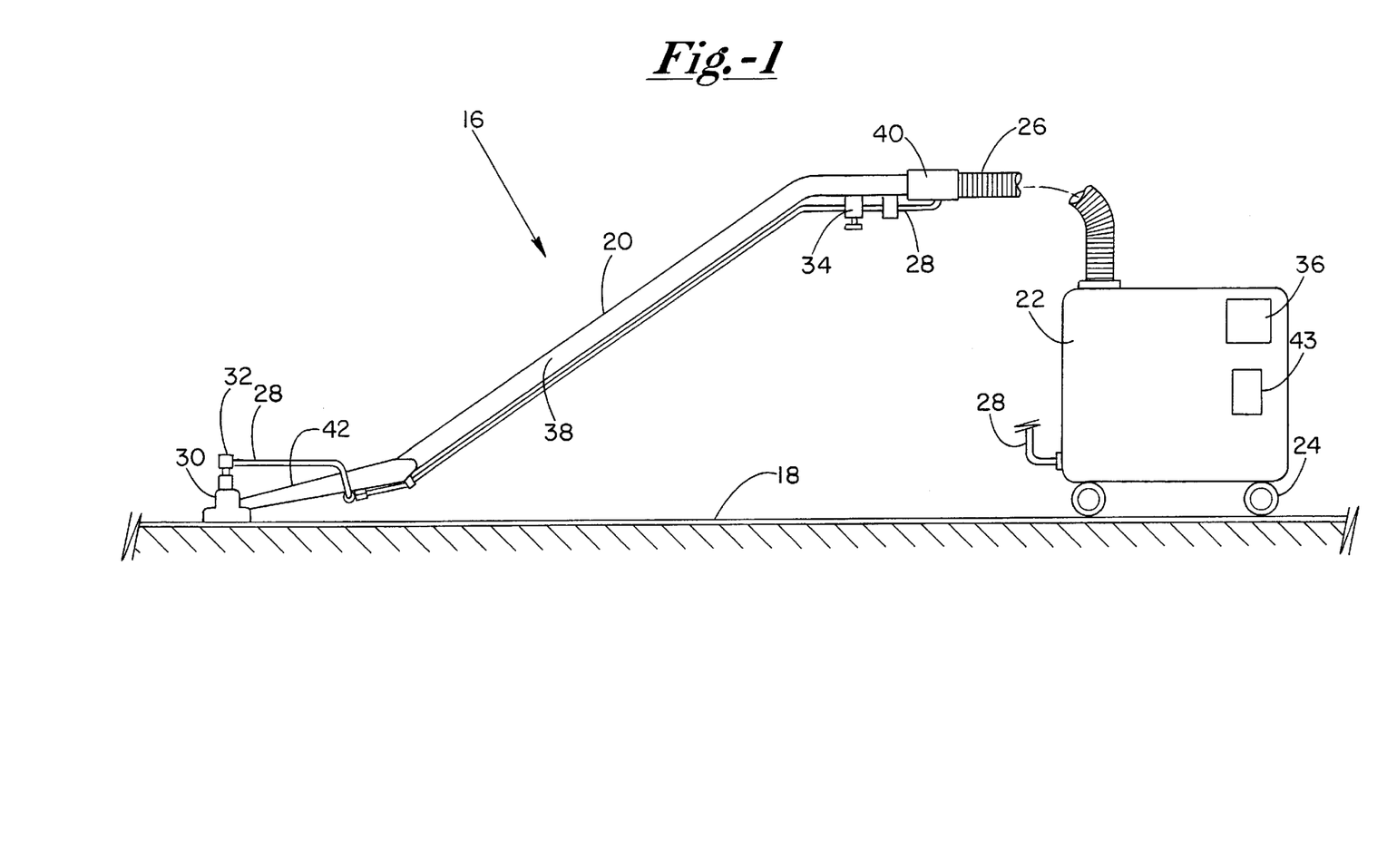
FIG. 1 is a side elevation of a continuous flow recycling surface cleaning device constructed in accordance with the present invention.

Turning now to the drawings, there is shown in FIG. 1 a vacuum operated continuous flow recycling surface cleaning device 16 for cleaning planar surfaces, such as a carpeted floor indicated at 18. The device includes a cleaning tool 20 and a tank or canister 22. The canister, which provides a reservoir for a liquid cleaning solution, is supported by wheels 24 that facilitate its movement across the floor. The cleaning tool is coupled to the canister by a vacuum conduit or hose 26 and liquid supply conduit or tubing 28. Conduits 26 and 28 are sufficiently pliable to allow manipulation of the tool independently of canister 22.

The cleaning tool includes a cleaning tool head 30, shown in the operating position over an area of floor 18 to be cleaned. In this position, the tool head and floor cooperate to form an enclosed chamber. Liquid cleaning solution is supplied to the chamber via conduit 28 to a manifold 32, and then to a row of nozzles which spray the liquid into the chamber and toward the floor. A valve 34 along conduit 28 is adjustable to control the rate at which the cleaning fluid is supplied to the cleaning tool head. A vacuum motor and blower 36, mounted near canister 22 and integral with the canister, is operated to draw a partial vacuum within the canister, which in turn draws a partial vacuum through conduit 26. Conduit 26 is in fluid communication with the chamber beneath the cleaning tool head, through a length of rigid tubing 38 that includes a handle 40, and a somewhat triangular vacuum housing 42 open to tubing 38 and to the chamber.

An injection system 43 is mounted to canister 22 for introducing a sanitizing additive into the liquid cleaning solution. Injection system 43 is particularly well suited for introducing ozone into the liquid cleaning solution. As explained in greater detail below, ozone can be introduced directly into canister 22, along a dedicated conduit provided solely for ozone injection, or at other locations throughout cleaning device 16 where the cleaning solution is circulated.

Figure 2:
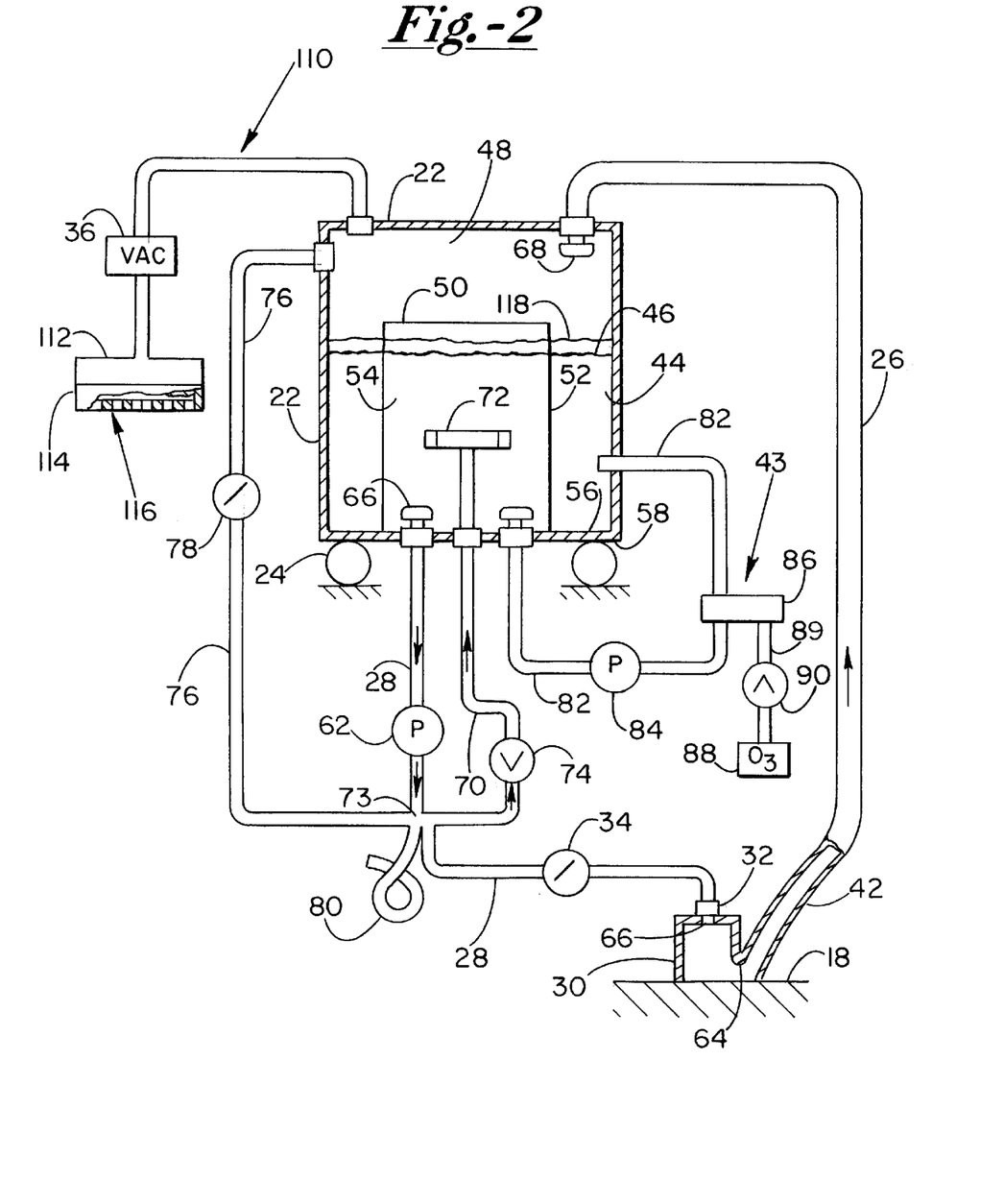
FIG. 2 is a diagrammatic view of the device including a system for adding ozone to the liquid cleaning solution cycled by the device.

The system for circulating and filtering the liquid cleaning solution is schematically illustrated in FIG. 2. Canister 22 is seen to contain liquid cleaning solution 44 to a surface level 46 selected to provide an ample upper air cavity 48. A filter 50, including a filter wall 52 substantially in the shape of an upright circular cylinder, is substantially submerged. Filter wall 52 is formed of a liquid permeable mesh or screen that can vary in size depending on the application. Typical mesh sizes range from 10–100 microns. Thus, while cleaning solution 44 passes easily through wall 52 into a chamber 54 defined by the wall, the wall tends to prevent entry of soil and other particulate matter. Heavier particulates tend to settle near the bottom of canister 22 outside of filter 50 as indicated at 56, while particles of lighter densities tend to float near surface level 46, likewise outside of the filter. Thus, cleaning solution within chamber 54 is virtually free of particulates exceeding a size commensurate with the selected mesh size.

Conduit 28 is mounted to a bottom wall 58 of the canister in a fluid-tight fashion. The conduit is open to chamber 22 through a mesh filter 60, and accommodates the flow of cleaning solution out of the chamber and through the conduit to cleaning tool head 30. A pump 62 is installed along conduit 28 to generate the desired liquid flow. Further downstream, valve 34 is operable to allow the liquid to flow to the cleaning tool head, to prevent such flow, and to assume intermediate positions to adjust the rate at which the liquid is supplied to manifold 32.

A partition 64 divides cleaning tool head 30 into two compartments: an intake compartment in which a row of nozzles, one of which is shown at 66, spray the cleaning solution toward floor 18; and an evacuation compartment in which a partial vacuum is created to draw the cleaning solution, along with extracted soil and other contaminants, upwardly away from the floor. Vacuum motor 36 is operated to create a partial vacuum within canister 22, facilitated by the substantially air-tight construction of the canister. The partial vacuum within the canister draws a partial vacuum throughout the length of conduit 26, and finally draws the partial vacuum within the evacuation compartment of the cleaning tool head. Consequently, a mixture of the cleaning solution, extracted contaminants and air is transported out of the evacuation chamber, along vacuum conduit 26 and into canister 22 through a coarse filter 68 that collects larger particles such as sand and lint. The vacuum motor and blower exhaust air to the outside of the canister.

The liquid circulating system has a counterflow subsystem including a liquid conduit or tubing 70, and a spray assembly 72 mounted to canister 22 and disposed within chamber 54. Conduit 70 is fluid coupled to conduit 28 downstream of pump 62 at a junction 73, to receive at least a portion of the liquid flow beyond the pump. A pressure-regulating device (valve) 74 is mounted along conduit 70 and controls the flow of the liquid into chamber 54 based on upstream fluid pressure. More particularly, if the liquid pressure at junction 73 exceeds a predetermined threshold, e.g. 400 psi (or more generally in a range of 50–2000 psi), pressure-regulating device 74 allows fluid to pass and enter the chamber. So long as the liquid pressure at the junction remains below the threshold, the pressure-regulating device prevents the liquid from flowing into the chamber.

Typically, when valve 34 is open and thus providing fluid to the cleaning tool head, pressure at junction 73 is below the threshold, and there is no return flow through conduit 70. Closure of valve 34 increases pressure at the junction to above the threshold, whereupon pressure-regulating device 74 allows the flow of liquid into chamber 54 through conduit 70. Should the liquid pressure at junction 73 exceed the threshold, despite valve 34 being open, pressure-regulating device 74 allows flow through conduit 70. By limiting the pressure at junction 73, pressure-regulating device 74 regulates the liquid pressure at cleaning tool head 30.

The counterflow cycle can be controlled manually, i.e. responsive to the operator's closure of valve 34. Alternatively, an automatic timer or a flow sensor along conduit 28 can control valve 34 or valve 74 on conduit 70, for appropriately timed or flow responsive switching between the cleaning cycle and the counterflow filter clearance cycle. Valve 34 or valve 74 thus is operable automatically to insure a desired frequency of the filter clearance cycle.

A priming and purging subsystem includes a primer conduit 76 open to the reservoir above liquid surface level 46 and open at its opposite end to junction 73. A primer valve 78 along the primer conduit is closed during normal operation. With primer valve 78 open, the subsystem is used to eliminate any entrapped air from the fluid circulating system. Typically, such priming and purging occurs when the device is drained and refilled.

Also open to the junction is a pressure shock absorbing device or shockwave device 80, which acts as a damping device to protect the rest of the fluid circulating system from shock and vibration due to sudden pressure shifts responsive to valve openings and closures.

System 43 includes an ozone-injection conduit 82 in fluid communication with canister 22 at a conduit inlet and a conduit outlet. Mounted along conduit 82 are a fluid pump 84 and an ozone injector 86 downstream of the pump. System 43 further includes an ozone generator 88, fluid coupled to injector 86 through a line 89 with one-way valve 90.

Figure 3:
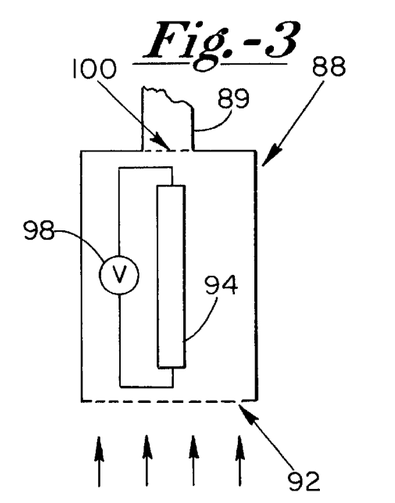
FIG. 3 is a diagrammatic view of an ozone generator used in the device.

As seen in FIG. 3, ozone generator 88 includes an air inlet passage 92, an ultraviolet lamp 94, and a high voltage source 98. Voltage source 98 supplies power to the lamp, which generates light having a wavelength in the range of 185–254 nm. The ultraviolet radiation generates ozone from oxygen in the air, as the air passes by lamp 94. Ozone generator 88 further includes an output 100 to line 89. Valve 90 permits flow of ozone (and other components of air, including oxygen) to injector 86, while preventing backflow toward the generator.

Figure 4:
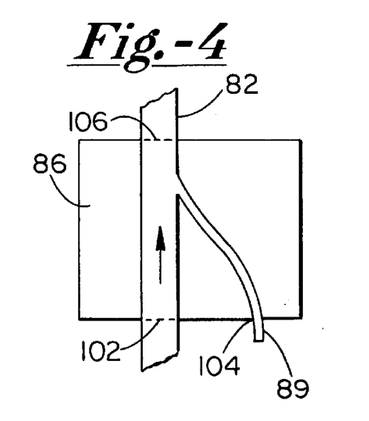
FIG. 4 is a diagrammatic view of an ozone injector used in the device.

Ozone injector 86, as seen in FIG. 4, includes an inlet 102 along conduit 82 for receiving the cleaning solution, and another inlet (suction port) 104 for receiving the ozone and other gases via line 89. Within the injector, the cleaning solution and ozone are mingled and emerge from the injector at a common outlet 106. Ozone is highly water soluble, more so than oxygen. Consequently much of the ozone is dissolved into the water-based liquid cleaning solution, both within injector 86 and along the portion of conduit 82 from the injector to an outlet 108, where the cleaning solution and ozone are provided to the reservoir, below surface level 46. A suitable injector is sold by Mazzei Injector Corporation, and is described in U.S. Pat. No. 4,123,800.

Ozone is an effective biocide at concentrations as low as 0.01 ppm. For optimum cleaning and microbiological control, a range of 0.05–0.5 ppm has been found appropriate. Injection system 43 preferably operates continuously, initially to increase the ozone concentration in the cleaning solution contained within the canister, and then to maintain the ozone concentration at a desired level. Alternatively, system 43 may be operated continuously to increase the ozone concentration, then intermittently to replenish the ozone and thus maintain its concentration within a desired range.

Ozone dissolved within the cleaning solution provides benefits throughout the pathway over which the cleaning solution circulates, which when broadly considered encompasses vacuum conduit 26, liquid conduit 28, counterflow conduit 70, primer conduit 76 and ozone introduction conduit 82, as well as the interior of canister 22. When introduced into canister 22 from conduit 82, the treated cleaning solution begins to work on soils in the liquid within the canister and on interior surfaces of the canister and filter 50 as it comes into contact with these surfaces. As it proceeds through the filter wall into chamber 54, then through mesh filter 60, the treated cleaning solution tends to clean and sanitize these filters. Likewise, the treated cleaning solution tends to clean and sanitize conduit 28 and pump 62 as it proceeds to cleaning tool head 30, and also is beneficial to the tool head components, such as manifold 32 and nozzles 66.

When sprayed onto floor 18, the treated liquid cleaning solution sanitizes and deodorizes the carpeting, as well as freeing embedded soils. Finally, as it returns to the canister within a stream that also includes air and extracted soils, the treated solution continues to work on the soils, along with the interior surfaces of cleaning tool head 30, rigid tubing 38, conduit 26 and coarse filter 68. Treated liquid diverted through conduit 70 for counterflow cleans and sanitizes interior surfaces of conduit 70 and spray assembly 72.

Some of the ozone is not dissolved, but rather remains in its gaseous state and rises to upper cavity 48 when introduced into the canister. While in the cavity, the gaseous ozone acts as a scrubber, deodorizing and sanitizing air within the cavity, and within an exhaust system 110 that includes vacuum motor 36. Ozone has been found to effectively perform this function over a wide range of concentrations, e.g. from 0.01 to about 4 ppm.

The present EPA (Environmental Protection Agency) standard for the concentration of ozone in ambient air is 0.12 ppm. In general, air leaving exhaust system 110 is rapidly dispersed so that the ozone concentration in ambient air remains well below the EPA standard. However, to ensure that ozone concentrations remain well within safe levels even in closed, confined spaces, exhaust system 110 can include an exit housing 112 containing a filter 114 adjacent several exhaust ports 116, so that air is channeled through the filter as it exits housing 112. A highly preferred filter is a bed of activated carbon that catalytically converts excess ozone into oxygen. As a result, the concentration of $O_3$ at exhaust ports 116 is less than 0.1 ppm. As a further precaution, a monitor (not shown) can be installed to shut down the system or provide a warning if the ozone concentration exceeds a designated threshold.

As noted above, the ozone provides benefits throughout the system, regardless of whether it is dissolved into the cleaning solution or remains in a gaseous state. The proportion of the ozone dissolved to that remaining gaseous is not critical, and is influenced by the rate of ozone generation, the volume and velocity of cleaning solution along conduit 82, and perhaps the length of conduit 82 between injector 86 and the canister. The primary benefit is derived from maintaining an appropriate ozone concentration in the liquid cleaning solution, and secondly an appropriate concentration within cavity 48.

The ozone concentration in the cleaning solution also is influenced by the tendency of dissolved ozone to escape from the liquid into the air. This phenomenon, known as "out gassing", occurs primarily within canister 22, due to the amount of the cleaning solution inside the canister and the partial vacuum maintained in upper air cavity 48. In general, it is advantageous to minimize the out gassing tendency, to maintain a higher concentration of ozone in the cleaning solution.

To this end, a surfactant (surface-active agent) is incorporated into the cleaning solution at low concentrations. When dissolved in the cleaning solution, the surfactant reduces the surface tension of the liquid. Consequently, normal agitation of the cleaning solution as it is circulated throughout the fluid pathway forms a layer or cap of foam over the liquid at surface level 46, as indicated at 118 in FIG. 2. Foam cap 118 can vary in thickness from about 1/8 of an inch to more than about 3 inches. The foam cap acts as a barrier to considerably reduce the loss of ozone due to out gassing, and in some cases to virtually eliminate the out gassing.

Suitable surfactants not only reduce surface tension, but also are resistant to combining or interacting with the ozone, to facilitate formation of foam cap 118 without using up or destroying dissolved ozone. Examples of suitable surfactants include sodium alkyl sulfates and alkyl aryl disulfonates. More particularly, sodium octyl sulfate has been found effective when incorporated into the cleaning solution in concentrations of about 10–100 ppm, more preferably at concentrations of 10–30 ppm. The preferred concentration varies with the particular surfactant selected, but in general is less than about 200 ppm.

By reducing out gassing, foam cap 118 provides for improved retention of dissolved ozone in the cleaning solution, thus increasing the benefits derived from the dissolved ozone as the liquid circulates throughout the system. Further, the choice of surfactant and its concentration can be employed to control or tailor the foam cap, especially as to its thickness, thereby controlling the concentration of ozone to meet particular needs.

Figure 5:
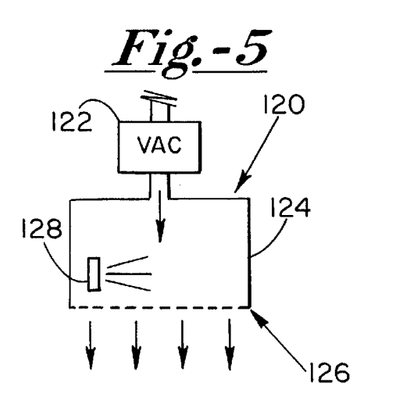
FIG. 5 illustrates an alternative ozone filtration exhaust for the device.

FIG. 5 shows an alternative exhaust system 120 for use with the cleaning device in lieu of exhaust system 110. Exhaust system 120 includes a vacuum blower 122 and an exit housing 124 with apertures 126 for release of air from the canister. Inside the exit housing is a source 128 of radiation in the ultraviolet range, more preferably at a wavelength of 386 nm. The radiation breaks down the ozone into oxygen, again so that air emerging from exit housing 124 has a sufficiently low concentration of ozone.

Figure 6:
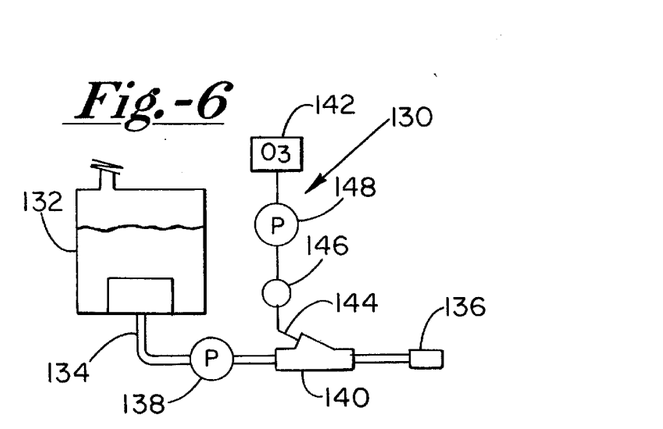
FIGS. 6–12 illustrate further alternative embodiments that vary primarily as to the selected location of ozone injection.

While the ozone introduction system just discussed is well suited to a cleaning device that recovers and recycles the liquid cleaning solution, ozone likewise can be introduced into a system in which the cleaning solution is not recovered for reuse. Moreover, ozone concentrations can be influenced advantageously by selecting one or more locations along the fluid flow pathway for introducing the ozone. Both of these points are illustrated in FIG. 6, which schematically illustrates a fluid cycling cleaning device 130 having a supply canister 132 initially filled with the liquid cleaning solution, a dispensing conduit 134 and a cleaning tool head 136 for directly applying the solution to the area being cleaned. A liquid pump 138 moves the fluid toward head 136. Downstream of pump 138 is an ozone injector 140 which transmits the cleaning solution and further is open to receive ozone from an ozone generator 142. The ozone is provided over a line 144 having a one-way valve 146. The line further may incorporate an air pump or gas pump, as indicated at 148.

The air pump promotes the flow of the ozone-laden air into the injector, augmenting the tendency of the liquid cleaning solution to draw the ozone and air into the injector as the liquid flows through the injector. Pump 148 is necessary in cases where the flow of liquid, alone, is not expected to draw a sufficient volume of the ozone-laden air into the injector.

Ozone can be introduced either upstream or downstream of valve 34, and in either event provides a maximum concentration of ozone just upstream of the point of application, i.e. the cleaning tool head. Thus, as compared to the approach described in connection with FIGS. 1–4 and assuming the same average ozone concentration, the tendency is to increase effectiveness at the cleaning tool head while decreasing effectiveness within the canister.

Figure 7:
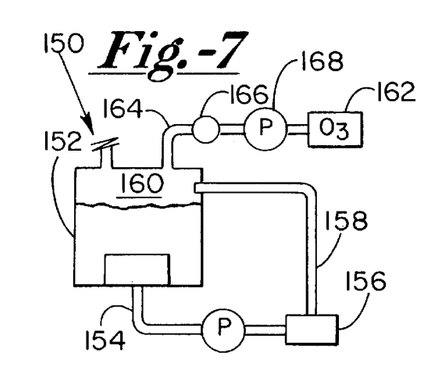

FIG. 7 illustrates a further alternative embodiment device 150 including a canister 152, a dispensing conduit 154, a cleaning tool head 156 for applying the cleaning solution and a recovery conduit 158 for returning the solution, along with air and extracted soils, to the canister. An upper air cavity 160 in the canister is fluid coupled to an ozone source 162 over a line 164 that includes a one-way valve 166. In the event that the partial vacuum in canister 152 is not expected to provide the desired amount of ozone, an air pump can be provided along line 164, as indicated at 168.

Figure 8:
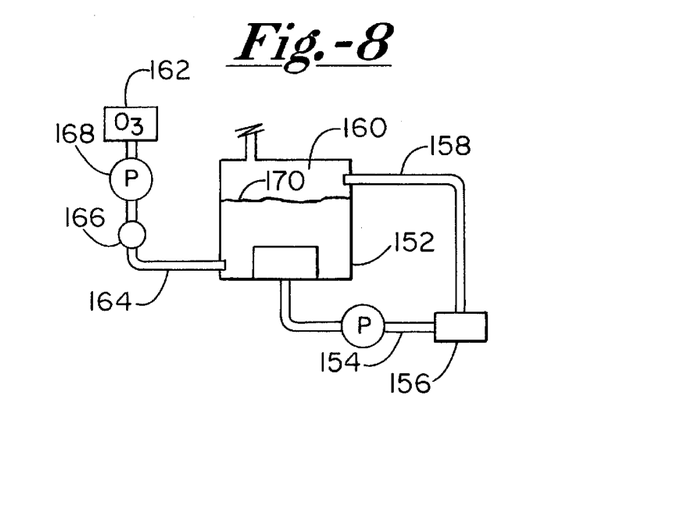

FIG. 8 shows a similar arrangement, except that line 164 is coupled to introduce the ozone below a surface level 170 of the cleaning solution in canister 152.

As compared to the arrangement in FIG. 7, the arrangement in FIG. 8 results in more of the ozone being absorbed by the cleaning solution. However, because the degree of absorption is low in either case, the approaches in FIGS. 7 and 8 affect primarily the upper cavity and exhaust, and ordinarily should be augmented by the introduction of ozone to the cleaning solution at a different point along the fluid flow pathway.

If desired, either of the arrangements in FIGS. 7 and 8 can be utilized in a system incorporating separate canisters for respectively supplying and recovering the liquid cleaning solution. In each case, dispensing conduit 154 would be coupled between a supply canister and cleaning tool head 156. Recovery conduit 158 would be coupled between the cleaning tool head and the recovery canister, in the same manner as the conduit is shown coupled to canister 152 in the figures.

Figure 9:
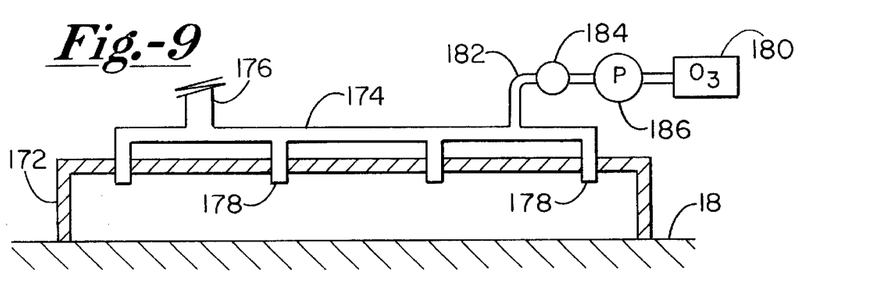

FIG. 9 illustrates a cleaning tool head 172 having a manifold 174 receiving the cleaning solution from a dispensing conduit 176 and distributing the liquid to a row of spray nozzles 178. An ozone source 180 also is coupled to manifold 174, through a line 182 that incorporates a one-way valve 184 and an air pump 186. This arrangement provides maximum ozone concentrations at the area of application.

Figure 10:
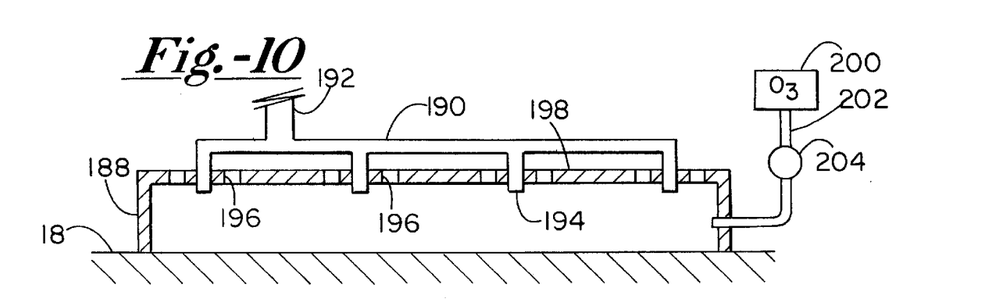

FIG. 10 illustrates a cleaning tool head 188 that incorporates a spray manifold 190 fluid coupled to a dispensing conduit 192 and having a row of injection nozzles 194. The cleaning tool head incorporates a row of slots 196 in its upper wall 198. Two of the slots are associated with each of the injection nozzles. The slots admit air into a compartment formed by the cleaning tool head and the floor, in response to the partial vacuum that draws recovered cleaning solution, air and soil away from the cleaning tool head.

An ozone source 200 is fluid coupled to the tool head enclosure, through a line 202 which incorporates a one-way valve 204. The partial vacuum that pulls air into the compartment also draws ozone into the compartment. Alternatively, a manifold (not shown) in fluid communication with slots 196 and with line 202, can be provided to direct the ozone into the tool head enclosure through all of the slots.

Figure 11:
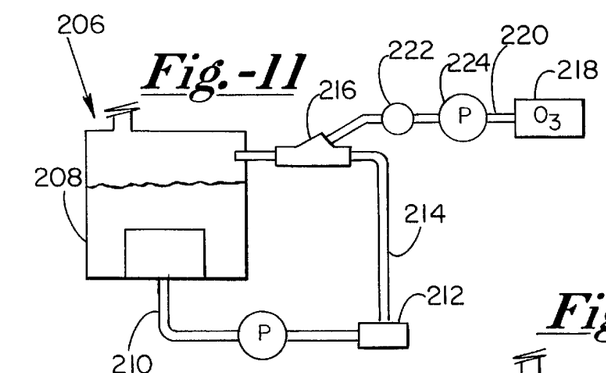

FIG. 11 illustrates an alternative cleaning device 206 including a canister 208, a dispensing conduit 210, a cleaning tool head 212 and a recovery conduit 214. An ozone injector 216 is disposed along the recovery conduit. An ozone source 218 is coupled to the injector through a line 220 which incorporates a one-way valve 222. An air pump 224 is also shown along line 220. As is the case with the other embodiments, the partial vacuum in canister 208 may be sufficient for introducing the desired amount of ozone, in which case the air pump is not required. This arrangement increases the tendency of the treated liquid and the ozone to clean and sanitize the return conduit and the upper cavity within the canister.

Figure 12:
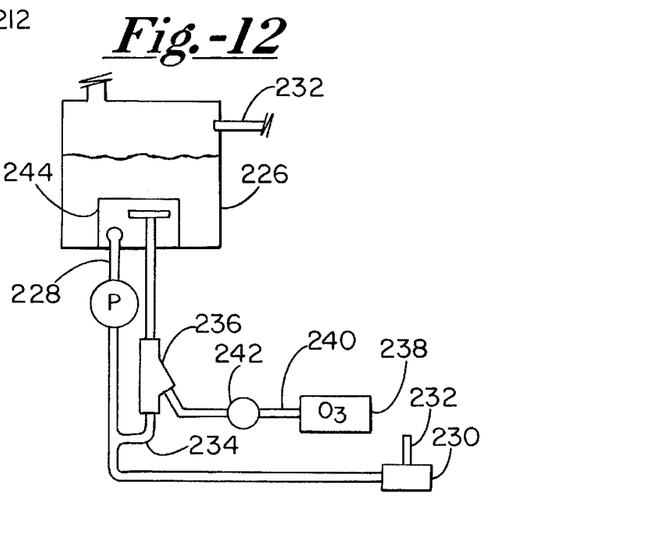

FIG. 12 illustrates yet another alternative device with a canister 226, dispensing conduit 228, cleaning tool head 230, and recovery conduit 232. The device further incorporates a counterflow conduit 234 similar to conduit 70. An injector 236 is provided along conduit 234 and coupled to an ozone source 238 through a line 240 which has a one-way valve 242.

There are several features of this approach. One is that the ozone is introduced into the liquid flow at a point where the cleaning solution is filtered, and therefore relatively clean and free of contaminants. Secondly, the cleaning solution after ozone injection is returned to the canister, to a location within a filter 244. Consequently ozone concentration is increased more rapidly inside of the filter, where the cleaning solution is supplied to the dispensing conduit. At the same time, this arrangement reduces the tendency of the ozone to work on contaminants in the canister but outside of the filter.

Given the above alternative approaches, it can be appreciated that ozone can be introduced at several locations along the fluid flow pathway, to achieve different desired levels of ozone concentration at and near the points of introduction.

Thus in accordance with the present invention, a non-polluting sanitizing agent can be selectively introduced into the fluid flow pathways of liquid cycling cleaning systems including continuous flow systems that recover the cleaning solution for reuse. The sanitizing agent, ozone, is non-corrosive and effective in the preferred ranges of concentration, both when dissolved in the cleaning solution and when mingled with the solution while remaining in a gaseous state. Ozone is effective against many contaminants that resist ordinary cleaning solution, and further is effective against certain contaminants under conditions in which conventional agents such as quaternary ammonium compounds, chlorine and acids have little impact. The natural decay of ozone into oxygen eliminates the pollution and waste disposal concerns that accompany conventional sanitizing agents, and avoids the residue left by other agents in carpeting and other cleaned surfaces. Finally, the ozone when introduced at a variety of selected locations, enhances efficiency through improved control over ozone concentration near the locations selected.

What is claimed is:

1. A fluid cycling cleaning system, including:

a reservoir containing a liquid cleaning solution;

a conveying means for moving the liquid cleaning solution into and out of the reservoir, said conveying means including at least a dispensing conduit in fluid communication with the reservoir for conveying the cleaning solution from within the reservoir to an application area outside of the reservoir, and a supply conduit in fluid communication with the reservoir for providing the liquid cleaning solution to the reservoir, wherein the fluid supply conduit includes a recovery segment for conveying the cleaning solution from the application area back to the reservoir;

wherein the reservoir and conveying means cooperate to provide a fluid pathway for the liquid cleaning solution;

an ozone source; and a coupling means for fluid coupling the ozone source and the fluid pathway, for introducing ozone from the ozone source into the fluid pathway at a selected location along the fluid pathway.

2. The system of claim 1 wherein:

said ozone source comprises an ozone generator.

3. The system of claim 2 wherein:

the ozone is introduced in a gaseous state, and at least some of the ozone remains in the gaseous state after its introduction into the fluid pathway.

4. The system of claim 1 wherein:

said ozone is introduced in a gaseous state, and at least some of the ozone is dissolved into the liquid cleaning solution at and proximate said selected location.

5. The system of claim 4 wherein:

the ozone is introduced continually, and the cleaning solution at and proximate the selected location has a concentration of the ozone in the range of about 0.05–0.5 ppm.

6. The system of claim 1 wherein:

the reservoir is substantially closed and includes an air cavity above the liquid cleaning solution in the reservoir.

7. The system of claim 1 further including:

an ozone introduction conduit independent of the dispensing conduit and the supply conduit and having an inlet receiving the cleaning solution from within the reservoir and an outlet for providing the cleaning solution back to the reservoir; and wherein said selected location is along the ozone introduction conduit between the inlet and the outlet.

8. The system of claim 7 further including:

a liquid pump along the ozone introduction conduit upstream of the selected location.

9. The system of claim 1 wherein:

said coupling means includes an ozone injector along the fluid pathway at the selected location, said injector including a first inlet coupled to receive the cleaning solution and a second inlet coupled to receive the ozone from the ozone source, and an outlet for providing the cleaning solution and the ozone to the fluid pathway downstream of the injector.

10. The system of claim 1 further including:

a liquid pump near the selected location for conveying the cleaning solution along the liquid pathway.

11. In a fluid cycling cleaning system including a reservoir containing a liquid cleaning solution, a fluid dispensing conduit for conveying the cleaning solution from within the reservoir to an application area for cleaning, and a recovery conduit for conveying the cleaning solution away from the application area after its application: an apparatus for introducing ozone to the liquid cleaning solution, including:

an ozone injection means disposed at a selected location along a fluid pathway that comprises at least the reservoir, the fluid dispensing conduit and the recovery conduit;

an ozone source; and a one-way valve between the ozone source and the ozone injection means;

wherein the ozone injection means includes a first inlet for receiving the cleaning solution and a second inlet in fluid communication with the ozone source for receiving ozone from the ozone source, and a common outlet for providing the cleaning solution and the ozone to the fluid pathway downstream of the selected location.

12. The apparatus of claim 11 further including:

a liquid pump in the fluid pathway proximate the injection means.

13. The apparatus of claim 11 wherein:

said reservoir is substantially enclosed and incorporates an air cavity above the liquid cleaning solution, and wherein the recovery conduit is open to the air cavity.

14. The apparatus of claim 13 further including:

an exhaust system open to the air cavity, and a vacuum means within the exhaust system for drawing a partial vacuum in the air cavity and thereby drawing the cleaning solution and air from the application area to the reservoir.

15. A process for introducing ozone into a liquid cleaning solution used in a fluid cycling cleaning system that includes a reservoir containing the liquid cleaning solution; including:

using a dispensing conduit to convey the cleaning solution from the reservoir to an application area;

using a return conduit to convey the cleaning solution from the application area back to the reservoir after its application;

fluid coupling an ozone source to a selected location along a fluid flow pathway that includes at least the reservoir, the dispensing conduit and the return conduit; and conveying the ozone from the ozone source to the selected location, and intermingling the ozone and the cleaning solution at the selected location, whereby the cleaning solution downstream of the selected location incorporates the ozone.

16. The process of claim 15 wherein:

the fluid flow pathway further includes an ozone introduction conduit independent of the dispensing conduit and the return conduit with an inlet for receiving the cleaning solution from the reservoir and an outlet for providing the cleaning solution back to the reservoir; and wherein said fluid coupling includes coupling the ozone source to the ozone introduction conduit.

17. A cleaning system, including:

a reservoir, and a liquid cleaning solution contained in the reservoir;

a conveying means for moving the cleaning solution into and out of the reservoir, said conveying means including at least a dispensing conduit in fluid communication with the reservoir for conveying the cleaning solution from within the reservoir to an application area outside of the reservoir, and a return conduit in fluid communication with the reservoir for providing the liquid cleaning solution to the reservoir, wherein the reservoir and the conveying means cooperate to provide a fluid pathway for the cleaning solution;

a means for introducing ozone to the cleaning solution at a selected location along the fluid pathway, whereby at least some of the ozone is dissolved into the cleaning solution at and proximate the selected location; and a surfactant incorporated into the liquid cleaning solution at a concentration in the range of about 10 to about 200 ppm, said surfactant being resistant to interacting or combining with the dissolved ozone.

18. The system of claim 17 wherein:

said surfactant consists essentially of at least one of the following: a sodium alkyl sulfate; a sodium octyl sulfate and an alkyl aryl disulfonate.

19. The system of claim 18 wherein:

said surfactant consists essentially of sodium octyl sulfate and is incorporated at a concentration of 10–30 ppm.

20. The system of claim 1 wherein:

the reservoir is substantially closed and includes an air cavity above the liquid cleaning solution in the reservoir; and the recovery segment is in fluid communication with the air cavity to convey the cleaning solution and air to the cavity responsive to a partial vacuum in the cavity.

21. The system of claim 20 further including:

an air exhaust system in fluid communication with the air cavity, for drawing air out of the air cavity to provide said partial vacuum.

22. The system of claim 21 further including:

a filtration means within the exhaust system for removing ozone from the air drawn from the air cavity.

23. The system of claim 22 wherein:

said filtration means includes one of the following: an activated carbon filter, and a means for generating ultraviolet radiation.

24. The system of claim 1 wherein:

the ozone is introduced along the recovery segment.

25. The system of claim 1 wherein:

the reservoir is substantially closed and includes an air cavity above the liquid cleaning solution, and the recovery segment is in fluid communication with the air cavity to convey the cleaning solution and air to the cavity responsive to a partial vacuum in the cavity; and said selected location is either along the recovery segment or at an interface of the recovery segment and the air cavity.

26. The system of claim 1 wherein:

said conveying means further includes a counterflow conduit fluid coupled to the dispensing segment and to the reservoir, for diverting at least some of the liquid from the dispensing segment back to the reservoir; and said selected location is along the counterflow conduit.

27. The system of claim 1 wherein:

the selected location is within the reservoir, and the coupling means includes an air pump coupled between the ozone source and the reservoir.

28. The system of claim 1 wherein:

the selected location is along the dispensing conduit.

29. The system of claim 1 further including:

a cleaning tool head along the dispensing conduit at the application area, with the selected location being proximate the cleaning tool head.

30. The process of claim 15 wherein:

said fluid coupling comprises coupling the ozone source to one of the following:

the reservoir, the dispensing conduit, and the return conduit.

31. The process of claim 15 further including:

diverting at least a portion of the cleaning solution flowing along the dispensing conduit back to the reservoir along a counterflow conduit, and coupling the ozone source along the counterflow conduit.

32. A fluid cycling cleaning system, including:

a reservoir containing a liquid cleaning solution;

a conveying pathway for moving the liquid cleaning solution into and out of the reservoir, said conveying pathway including at least a dispensing conduit in fluid communication with the reservoir for conveying the cleaning solution from within the reservoir to an application area outside of the reservoir, and a supply conduit in fluid communication with the reservoir for providing the liquid cleaning solution to the reservoir;

an ozone introduction conduit independent of the dispensing conduit and the supply conduit and having an inlet receiving the cleaning solution from within the reservoir and an outlet providing the cleaning solution back to the reservoir;

an ozone source; and a coupling means for fluid coupling the ozone source and the ozone introduction conduit, to facilitate an intermingling of ozone and the liquid cleaning solution along the ozone introduction conduit.

33. In a fluid cycling cleaning system including a substantially enclosed reservoir containing a liquid cleaning solution and incorporating an air cavity above the liquid cleaning solution, a fluid dispensing conduit for conveying the cleaning solution from within the reservoir to an application area for cleaning, and a recovery conduit open to the air cavity for conveying the cleaning solution away from the application area after its application; an apparatus for introducing ozone to the liquid cleaning solution, including:

an ozone injector disposed at a selected location along a fluid pathway that comprises at least the reservoir, the fluid dispensing conduit, and the recovery conduit;

an ozone source; and an exhaust system open to the air cavity, and a vacuum component within the exhaust system for drawing a partial vacuum in the air cavity and thereby drawing the cleaning solution and air from the application area to the reservoir;

wherein the ozone injector includes a first inlet for receiving the cleaning solution and a second inlet in fluid communication with the ozone source for receiving ozone from the ozone source, and a common outlet for providing the cleaning solution and the ozone to the fluid pathway downstream of the selected location.

* * * * *